United States Patent [19]

Wildi et al.

[11] Patent Number: 5,580,924
[45] Date of Patent: *Dec. 3, 1996

[54] REDUCED GLOSS THERMOPLASTIC COMPOSITIONS AND PROCESSES FOR MAKING THEREOF

[75] Inventors: Robert H. Wildi, Parkersburg; Keith E. Cox, Mineral Wells, both of W. Va.; Edward J. Fewkes, Belpre, Ohio

[73] Assignee: General Electric Company, Pittsfield, Mass.

[*] Notice: The term of this patent shall not extend beyond the expiration date of Pat. No. 5,336,701.

[21] Appl. No.: 21,746

[22] Filed: Feb. 23, 1993

Related U.S. Application Data

[63] Continuation of Ser. No. 841,141, Feb. 25, 1992, abandoned.

[51] Int. Cl.$^6$ ............................ C08L 63/00; C08L 51/04; C08L 33/18; C08L 55/02
[52] U.S. Cl. .................... 525/65; 525/67; 525/71; 525/107; 525/217; 525/238; 525/329.1; 523/406; 524/128
[58] Field of Search ........................... 525/65, 67, 71, 525/194, 195, 197, 217, 238, 108; 524/128; 523/406

[56] References Cited

U.S. PATENT DOCUMENTS

| | | | |
|---|---|---|---|
| 2,890,209 | 6/1959 | Phillips | 528/361 |
| 4,000,216 | 12/1976 | Lang | 525/67 |
| 4,526,926 | 7/1985 | Weber et al. | 525/67 |
| 4,554,316 | 11/1985 | Sakano et al. | 525/71 |
| 4,624,986 | 11/1986 | Weber et al. | 525/67 |
| 4,683,265 | 7/1987 | Kress et al. | 525/71 |
| 4,885,335 | 12/1989 | Gallucci et al. | 525/67 |
| 4,898,911 | 2/1990 | Miyashita et al. | 525/74 |
| 4,902,743 | 2/1990 | Boutni | 525/67 |
| 4,906,689 | 3/1990 | Boutni | 525/67 |
| 5,026,777 | 6/1991 | Jalbert et al. | 525/65 |
| 5,061,754 | 10/1991 | Dufour et al. | 525/67 |
| 5,104,935 | 4/1992 | Leitz et al. | 525/67 |
| 5,130,374 | 7/1992 | Cozens et al. | 525/239 |
| 5,336,701 | 8/1994 | Wildi et al. | 525/107 |

FOREIGN PATENT DOCUMENTS

| | | |
|---|---|---|
| 0095919 | 12/1983 | European Pat. Off. . |
| 0330153 | 8/1989 | European Pat. Off. . |
| 0375648 | 6/1990 | European Pat. Off. . |
| 0352822 | 1/1990 | Japan . |

OTHER PUBLICATIONS

John J. Ritter et al, Journal of American Chemical Society, 1948, vol. 70, pp. 4045–4048.

*Primary Examiner*—Tae Yoon

[57] ABSTRACT

Reduced gloss polycarbonate graft polymer blends are provided by a process which involves compounding styrene-acrylonitrile copolymer in the presence of an electrophilic reagent and preferably an acid to form gels, and then compounding the resultant gels with polycarbonate, a styrene-acrylonitrile copolymer and ABS graft polymer to form reduced gloss PC/ABS/SAN composition. The process limits side reactions during gel formation by preparing the gels first and then compounding the gels with the other resin materials. The blends are useful as molding resins and the gelled acrylonitrile polymer is useful as a gloss reducing additive.

27 Claims, No Drawings

REDUCED GLOSS THERMOPLASTIC COMPOSITIONS AND PROCESSES FOR MAKING THEREOF

This is a continuation of application Ser. No. 07/841,141 filed on Feb. 25, 1992, now abandoned.

BACKGROUND OF THE INVENTION

1. Field of the Invention

The present invention relates to reduced gloss thermoplastic compositions, gloss reducing additives, and processes for making the compositions and additives, and more particularly relates to reduced gloss thermoplastic compositions, gels of rigid copolymers, and process for making the gels and compositions.

2. Description of the Related Art

Low gloss compositions comprising a polymer blend of a polycarbonate and an emulsion grafted ABS polymer, and a low gloss enhancing amount of a poly(epoxide) are known, see Jalbert et al U.S. Pat. No. 5,026,777 which is incorporated herein by reference. Single step compounding however can result in undesired side reactions, including side reactions of the polyepoxide with additional ingredients such as phosphite stabilizers and some organic and metal pigments which may affect product consistency and quality.

SUMMARY OF THE INVENTION

The present invention is directed to a process for making a reduced gloss resin composition in which the matte finish is achieved by gelation of a styrene-acrylonitrile copolymer to form insoluble gels and then blending the gels with an aromatic polycarbonate resin, a graft polymer resin, and optionally additional rigid styrene-acrylonitrile copolymer. The present process limits the occurrence of side reaction that may result from single step compounding of the compositions. The process provides consistent, quality product that when molded exhibits a uniform low gloss.

DETAILED DESCRIPTION OF THE INVENTION

The thermoplastic molding compositions of the invention comprise a polymer blend of a polycarbonate, an ABS graft polymer, styrene-acrylonitrile copolymer and acrylonitrile containing polymer which has undergone a Ritter reaction with the polyepoxide. Ritter reactions are discussed in J. J. Ritter, P. P. Mineri *Journal of American Chemical Society,* 1948,70,4045.

The ABS resin which is included in the present compositions comprises ABS type polymers, the molecules of which contain two or more polymeric parts of different composition, namely a rubbery backbone part and a graft portion, that are bonded chemically. The ABS polymer is preferably prepared by polymerizing a conjugated diene monomer, such as butadiene, or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. The ABS resins are preferably prepared by emulsion grafting methods well known in the art.

The specific conjugated diene monomers normally utilized in preparing the backbone of the graft polymer are generically described by the following formula:

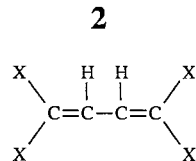

wherein X is selected from the group consisting of hydrogen, alkyl groups containing from one to five carbon atoms, chlorine or bromine. Examples of dienes that may be used are butadiene, isoprene, 1,3-heptadiene, methyl-1,1,3-pentadiene, 2,3-dimethylbutadiene, 2-ethyl-1,2-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3-butadiene.

Optionally, the rubbery backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer. These resins are well known in the art and many are commercially available.

The backbone part, as mentioned, is preferably a conjugated diene polymer such as polybutadiene, polyisoprene, or a copolymer, such as butadiene-styrene, butadiene-acrylonitrile, or the like.

One monomer or group of monomers that may be polymerized in the presence of the prepolymerized backbone to form the graft portion of the ABS graft polymer include monovinylaromatic compounds. The monovinylaromatic monomers utilized are generically described by the following formula:

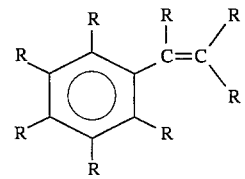

wherein R is selected from the group consisting of hydrogen, alkyl groups of 1 to 5 carbon atoms, cycloalkyl, aryl, alkaryl, aralkyl, alkoxy, aryloxy, and halogens. Examples of substituted vinylaromatic compounds include styrene, 4-methylstyrene, 3,5-diethylstyrene, 4-n-propylstyrene, α-methylstyrene, αmethyl vinyltoluene, α-chlorostyrene, α-bromostyrene, dichlorostyene, dibromostyrene, tetrachlorostyrene, mixtures thereof and the like. The preferred monovinylaromatic monomers used are styrene and/or α-methylstyrene.

A second group of monomers that may be polymerized in the presence of the prepolymerized backbone to form the graft portion of the ABS resin include acrylic monomers such as acrylonitrile, substituted acrylonitrile, and/or acrylic acid esters, for example alkyl acrylates such as methyl methacrylate.

The acrylonitrile, substituted acrylonitrile, or acrylic acid esters are described generically by the following formula:

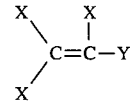

wherein X is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, β-bromoacrylonitrile, optionally with methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate. It is also preferred that the acrylic acid esters, when included, are employed in combination with acrylonitrile.

In the preparation of the ABS graft polymer, the rubbery backbone part which is preferably a conjugated diolefin polymer or copolymer exemplified by a 1,3-butadiene polymer or copolymer is present at a level of at least 10% by weight, and preferably at least 25% by weight, more preferably at least 50% by weight and up to about 80% by weight, based on the total weight of the ABS graft polymer. The graft portion obtained by polymerizing monomers in the presence of the backbone, exemplified by styrene and acrylonitrile, which are preferably present at a level of from 20 to about 90% by weight based on the total weight of the ABS graft polymer. It is additionally preferred that the second group of grafting monomers, exemplified by acrylonitrile, ethyl acrylate and methyl methacrylate, comprise from about 10% to about 40% by weight of the grafted portion of the ABS resin while the monovinylaromatic hydrocarbon monomers, exemplified by styrene, comprise from about 60 to about 90% by weight of the grafted portion of the ABS resin.

In preparing the graft polymer, it is normal to have a certain percentage of the polymerizing monomers that are not grafted on the backbone combine with each other and occur as non-grafted monomers that are not grafted on the backbone combine with each other and occur as non-grafted rigid copolymer. If styrene is utilized as one grafting monomer and acrylonitrile is the second grafting monomer, a certain portion of the composition will copolymerize as free styrene-acrylonitrile copolymer. Similarly, in the case where α-methylstyrene (or another monomer) is substituted for the styrene in the composition used in preparing the graft polymer, a certain percentage of the composition may be an α-methylstyrene-acrylonitrile copolymer.

In the process of the present invention gels of acrylonitrile containing polymer, such as styrene-acrylonitrile copolymer or α-methylstyrene-acrylonitrile copolymer gels are blended with the graft ABS polymer and polycarbonate by mechanical blending following a first gelation step of compounding the rigid polymer with a polyepoxide and an acid to form gels. The rigid acrylonitrile polymers may be based on one or more of the following: acrylonitrile or substituted acrylonitrile either alone or in combination with monovinylaromatic compounds, methacrylic acid esters of $C_1$–$C_4$ aliphatic alcohols, and imidized maleic anhydride derivatives which are unsubstituted or substituted with an alkyl or aryl group. Examples of these rigid acrylonitrile copolymers which may be compounded with the polyepoxide and then blended with the ABS graft polymer and the polycarbonate resin include copolymers of acrylonitrile or substituted acrylonitrile with one or more of the $C_1$–$C_4$ acrylates, styrene, and/or α-methylstyrene, and the like. Preferably the acrylonitrile copolymer comprises at least 19% by weight, more preferably 5% by weight, and most preferably at least 10% by weight acrylonitrile monomer based on the amount to react in the presence of acid during compounding to form the acrylonitrile polymer gels. Such acrylonitrile polymers may be prepared by emulsion, bulk, suspension, bulk-suspension or solution polymerization methods which are well known in the art. Such acrylonitrile copolymers may also be rubber modified, for example, ABS, AES and ASA resins. Preferably, the rigid acrylonitrile polymers comprise less than 1 percent by weight rubber based on the total weight of acrylonitrile polymer, and more preferably free of rubber.

In a preferred embodiment of the invention, the ABS resin contains at least 70 wt % of the diene rubber backbone and little or no free rigid polymers or copolymers are included in the molding composition. In an alternative preferred embodiment, the ABS resin contains at least 50 wt % of the diene rubber backbone. The present compositions also contain a polycarbonate component. Polycarbonates are derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate made by reacting bisphenol A with phosgene by condensation. Also preferred are blends of bisphenol A polycarbonate with homopolymers and/or copolymers of brominated bisphenol A polycarbonate.

For a more complete discussion of the chemistry of polycarbonates, one may refer to Kirk-Othmer Encyclopedia of Chemical Technology, Third Edition (1982) Vol. 18, pp. 479–494. This article, by D. W. Fox, is incorporated by reference in its entirety.

The present compositions also include a poly(epoxide) component which preferably comprises a diepoxide. Various diepoxides which are useful in the present invention are described in U.S. Pat. No. 2,890,209. The diepoxides may be prepared by the catalytic esterification of 3,4-epoxycyclohexylmethyl 3,4-epoxycyclohexanecarboxylates and have the general formula:

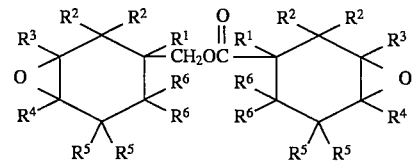

wherein $R^1$, $R^2$, $R^3$, $R^4$, $R^5$, and $R^6$ represent members selected from the group consisting of hydrogen and lower alkyl groups containing one to four carbon atoms. When any of $R^1$ through $R^6$ represent alkyl groups and particularly the lower alkyl groups, a preferred class of diepoxides are those wherein the total number of carbon atoms contained in the alkyl groups does not exceed twelve. A particularly preferred class of compounds represented by the general formula above are those wherein $R^1$ through $R^6$ represent members selected from the group consisting of hydrogen and methyl groups. Polymers and particularly the homopolymers made from diepoxide monomers and mixtures thereof having not more than three alkyl substituents per carbocyclic ring are preferred.

The diepoxides represented by the above formula can be conveniently prepared by reacting a selected 3-cyclohexenyl-methyl-3-cyclohexenecarboxylate with peracetic acid. The 3-cyclohexenyl-methyl-3-cyclohexenecarboxylates, in turn, are readily prepared by reacting a selected 3-cyclohexenecarboxy aldehyde in the presence of an aluminum alkoxide catalyst dissolved in an inert solvent, such as benzene, at a temperature in the range of 0° to 110° C.

The compositions of the invention preferably contain gels in an amount sufficient to enhance the matte finish of the blends. In preferred embodiments, the gels are formed by compounding composition consisting of an acrylonitrile containing polymer preferably styrene-acrylonitrile copolymer with from about 0.01 to about 10 weight percent of the polyepoxide based on the total weight of rigid acrylonitrile polymer, and more preferably from about 0.5 to about 4 weight percent of the polyepoxide based on the weight of the rigid acrylonitrile polymer. In other words, the rigid acrylonitrile polymer is compounded with an electrophilic reagent thereby undergoing a Ritter reaction and forming gels. Suitable electrophilic reagents include acid catalysts such as $Ti-OR_4$, $RSO_3H$, mineral acids, $BF_3$, amines, zinc halides such as zinc chloride.

The final reduced gloss compositions may also include conventional additives such as antioxidants, lubricants, pigments, phosphites, halogenated fire retardant additives, phosphate flame retardants and the like. Preferably the gelation step is free of additives which will interfere with the gelation process.

The compositions preferably comprise from about 10 to 90 weight percent aromatic polycarbonate resin based on the total weight of the composition, from 90 to 10 weight percent ABS graft polymer based on the total weight of the composition, and from 1 to 50 weight percent of rigid acrylonitrile polymer based on the total weight of the composition, wherein the rigid acrylonitrile polymer comprises a sufficient amount of gels to reduce the gloss of the composition. More preferably, the blend comprises from 30 to 80 weight percent polycarbonate, 30 to 5 weight percent ABS graft polymer, and from 5 to 65 weight percent rigid acrylonitrile polymer based on the total weight of the composition. The preferred rigid acrylonitrile polymer is a styrene-acrylonitrile copolymer.

The rigid acrylonitrile polymer gels may also be blended with other polymers to reduce the gloss thereof. Suitable other polymers include polycarbonate, polymethylmethacrylate, ABS, and blends such as polycarbonate/polymethylmethacrylate ABS blends. The gels of acrylonitrile polymer are preferably blended with thermoplastic resins that are chemically different from the acrylonitrile polymer, for example gels of styrene-acrylonitrile polymer blended with polycarbonate resin, acrylonitrile-butadiene-styrene graft copolymers, polymethylmethacrylate resin, and blends thereof.

The rigid copolymer gels are made by blending rigid acrylonitrile polymer with an electrophilic reagent such as a polyepoxide in the presence of an acid media. The resulting gelled acrylonitrile containing polymer composition is typically a blend of a non-crosslinked rigid acrylonitrile polymer and crosslinked rigid acrylonitrile polymeric gel. The gel containing compositions are useful to reduce the gloss of ABS/polycarbonate polymeric compositions.

A preferred diepoxide based resin comprises Bakelite® ERL 4221 supplied by Union Carbide. Other multifunctional epoxides that are expected to function in a manner similar to the preferred diepoxides include the following:

SIMPLE ALIPHATIC DIEPOXIDES dodecatriene dioxide;

dipentene dioxide;

1,2,7,8-diepoxy octane

BIS(GLYCIDYL ETHER/ESTER) EPOXIDES polycondensates of epihalohydrin and diols or diacids wherein the diol/diacid may be either aliphatic or aromatic, such as adipic acid and phthallic acid;

1,4 butanediol-diglycidyl ether;

Bis-glycidyl ether of bisphenol A

CYCLOALIPHATIC DIEPOXIDES 3,4-epoxycyclohexyl-3,4-epoxycyclohexylcarboxylate, e.g. Union Carbide's ERL 4221;

bis(c,4-epoxycyclohexylmethyl)adipate, e.g. Union Carbide's ERL 4229;

cyclooctadiene (1.5)di-epoxide;

1,2,5,6-diepoxy cyclododecane-9;

bicycloheptadiene diepoxide

MIXED ALIPHATIC AND CYCLOALIPHATIC DIEPOXIDES vinyl cyclobutene dioxide;

vinyl cyclopentadiene dioxide;

vinyl cyclohexene dioxide, e.g. Union Carbide's ERL 4206;

butenecyclobutene dioxide;

butenecyclopentene dioxide;

butadienecyclobutadiene dioxide;

butadienecyclopentadiene dioxide;

pentadienecyclobutadiene dioxide

TRI AND POLY (DI/TRI) EPOXIES glycidyl ethers, of novalaks, e.g. Dow;s D.E.R. 431 and Shell's Epon 1031;

tetraglycidyl ether of 1,1,2,2, tetrakis(4-hydroxyphenyl) ethane;

triglycidyl ether of 1,3,6-trihydroxybenzene;

triglycidyl isocyanurate (TGIC)

EPOXIDIZED DRYING AND NON-DRYING OIL ACIDS

Epoxidized tall oils, e.g. Monoplex S-73;

Epoxidized linseed oils;

Epoxidized soy bean oils, e.g. Paraplex G-62

In addition to diepoxides, other electrophilic reagents may be used in the gelation step.

In accordance with an important feature of the invention, the polymer compositions contain gels of a rigid acrylonitrile containing polymer preferably formed from styrene and acrylonitrile. More particularly, the rigid acrylonitrile polymer is preferably formed from at least about 50 weight percent of one or more monomers selected from the group consisting of styrene, α-methylstyrene and halogen-substituted styrene, and at least 5 weight percent acrylonitrile. Preferably, the rigid acrylonitrile polymer is formed from 10 to about 40 weight percent acrylonitrile. The rigid polymer may further include at least one additional monomer, for example maleic anhydride, methyl methacrylate and/or a maleimide, for example N-phenyl maleimide, as long as the rigid acrylonitrile polymer includes at least 10 weight percent acrylonitrile based on the total weight of the rigid acrylonitrile polymer. In a further preferred embodiment, the rigid acrylonitrile polymer is formed from styrene monomer and at least one monomer selected from α-methylstyrene and halogen-substituted styrene, in addition to the acrylonitrile. By compounding the rigid acrylonitrile polymer with a polyepoxide and an acid, insoluble polymeric gels are formed which when further blended with aromatic polycarbonate resin, styrene-acrylonitrile copolymer and ABS resin provide a composition exhibiting reduced gloss. Gloss is measured by ASTM D-523. Gels are defined as a crosslinked polymer which can be measured by solvent swell techniques and rheological methods well known in the art. Izod impact is measured by ASTM D-256 and melt viscosity is measured by ASTM D1238-73.

The gels of acrylonitrile rigid polymer are formed by a Ritter reaction which may involve formation of amides by addition of olefins or secondary and tertiary alcohols to nitrites in strongly acidic media. Suitable Ritter reagents include diepoxides, alkyl halides, alcohols, acid chlorides, anhydrides ethers, α and β unsaturated acids and esters. Suitable epoxide ring opening catalysts include, amines, imidazoles, organic acids, such as carboxylic, and sulfonic acids, and mineral acids and Lewis Acids.

EXAMPLES:

PC1 is a bisphenol A polycarbonate obtained by reacting bisphenol A with phosgene or diphonyl carbonate and was obtained from General Electric Company as Lexan® 101 polycarbonate resin.

PC2 is a biphenol A polycarbonate obtained by reacting bisphenol A with phosgene or diphonyl carbonate and was obtained from General Electric Company as Lexan® 125 resin.

PC3 is a biphenol A polycarbonate obtained by reacting bisphenol A with phosgene or diphenyl carbonate and was obtained from General Electric Company as Lexan® 105 resin.

PMMA is polymethylmethacrylate resin.

HRG1 is an ABS graft polymer comprising 50 percent by weight polybutadiene rubber, and 50 percent by weight of a styrene-acrylonitrile polymeric graft portion which comprises 75 percent by weight styrene and 25 percent by weight acrylonitrile. HRG1 also contains some free styrene-acrylonitrile copolymer.

SAN 1 is a styrene acrylonitrile copolymer comprising 72 weight percent styrene and 25 weight percent acrylonitrile.

SAN 2A is a styrene acrylonitrile copolymer comprising 75 weight percent styrene and 25 weight percent acrylonitrile.

SAN 2B is SAN 2A which has been exposed to melt extrusion through a 58 mm twin extruder.

SAN Gel-1 is SAN 2A which has been exposed to a Ritter reaction gelation step involving compounds SAN 2A and DEPX under melt extrusion through a 58 mm twin extruder in the presence of an acid. The DEPX is compounded with the SAN 2A at a level of 1.5 weight percent based on the total weight of the SAN 2A.

SAN Gel-2 is SAN 2A which has been exposed to the gelation step involving compounding SAN 2A and 1.75 weight percent DEPX based on the total weight of the SAN 2A and involving melt extrusion using a 58 mm twin extruder in the presence of an acid.

SAN Gel-3 is SAN 2A which has been exposed to the gelation step involving compound SAN 2A and 2.2 weight percent DEPX based on the total weight of the SAN 2A and involving melt extrusion using a 58 mm twin extruder in the presence of an acid.

DEPX is Bakelite® ERL 4221 supplied by Union Carbide (3,4-epoxycyclohexyl-3,4-epoxycyclohexylcarboxylate).

Phosphite is Ultranox 626 supplied by GE Specialty Chemicals (Bis(2,4-di-t-butyl phenyl) pentaerythitoldiphosphite.

Note that examples A–M are comparison examples and examples 1–22 are examples illustrating the present invention. Examples 1–3 comprise SAN Gel-2 and exhibit reduced gloss over examples A or B. Examples C and F are comparative controls. Examples D and G are comparative examples involving single step processes exhibiting low gloss but lacking a phosphite antioxidant additive. Example E is a comparative example involving a single step process and comprising a diepoxide and a phosphite. Note that the gloss of example E is much higher than example D. Examples 4–12 involve a two-step process wherein the SAN has first undergone the gelation step and then is compounded into the polycarbonate a styrene-acrylonitrile copolymer and ABS resin. Examples H–L were made using a single pass process. Examples 13–22 illustrate the gloss reduction achieved using SAN gels. Example 23 illustrates the advantage of using SAN-gels over a single pass process when a phosphite antioxidant is present in the formulation.

TABLE 1

|  | A | B | 1 | 2 | 3 |
|---|---|---|---|---|---|
| PC1 | 50 | 50 | 50 | 50 | 50 |
| PMMA | — | 38 | 30 | 25 | 20 |
| HRG | 12 | 12 | 12 | 12 | 12 |
| SAN 1 | 38 | — | — | — | — |
| SAN-Gel-2 | — | — | 8 | 13 | 18 |
| Gloss @ 60° | 96 | 91 | 50 | 34 | 27 |

TABLE 2

|  | C | D | E | F | G | 4 | 5 | 6 | 7 | 8 | 9 | 10 | 11 | 12 | 23 |
|---|---|---|---|---|---|---|---|---|---|---|---|---|---|---|---|
| PC 2 | 40 | 40 | 40 | 40 | 40 | 40 | 40 | 40 | 40 | 40 | 40 | 40 | 40 | 40 | 40 |
| SAN 2A | 45 | 45 | 45 | — | — | 38.3 | 25 | 11.7 | 39.3 | 27.9 | 16.4 | 40.5 | 31.4 | 22.3 | 25 |
| SAN 2B | — | — | — | 45 | 45 | — | — | — | — | — | — | — | — | — | — |
| SAN Gel-1 | — | — | — | — | — | 6.7 | 20 | 33.3 | — | — | — | — | — | — | 20 |
| SAN Gel-2 | — | — | — | — | — | — | — | — | 5.7 | 17.1 | 28.6 | — | — | — | — |
| SAN Gel-3 | — | — | — | — | — | — | — | — | — | — | — | 4.5 | 13.6 | 22.7 | — |
| HRG 1 | 15 | 15 | 15 | 15 | 15 | 15 | 15 | 15 | 15 | 15 | 15 | 15 | 15 | 15 | 15 |
| DEPX | — | 0.3 | 0.3 | — | 0.3 | — | — | — | — | — | — | — | — | — | — |
| Phosphite | — | — | 0.3 | — | — | — | — | — | — | — | — | — | — | — | 0.3 |
| % Epoxy in Blend | — | 0.3 | 0.3 | — | 0.3 | 0.1 | 0.3 | 0.5 | 0.1 | 0.3 | 0.5 | 0.1 | 0.3 | 0.5 | 0.3 |

Materials compounded on the 34 MM Leistritz at 250 rpm, 21.5 amps

TABLE 2-continued

|  | C | D | E | F | G | 4 | 5 | 6 | 7 | 8 | 9 | 10 | 11 | 12 | 23 |
|---|---|---|---|---|---|---|---|---|---|---|---|---|---|---|---|
| Hunter Gloss | | | | | | | | | | | | | | | |
| 60° | 94 | 29 | 95 | 94 | 51 | 95 | 92 | 44 | 94 | 80 | 23 | 93 | 48 | 16 | 82 |
| 85° | — | 87 | — | — | — | — | — | — | — | — | 81 | — | — | 63 | — |
| 20° | 72 | — | 76 | 74 | — | 76 | 69 | — | 76 | 42 | — | 74 | — | — | 46 |
| Melt Viscosity @ 500° F. (poise) | | | | | | | | | | | | | | | |
| 1000 sec-1 | 1336 | 1697 | 1438 | 1348 | 1734 | 1431 | 1482 | 1621 | 1387 | 1537 | 1752 | 1400 | 1564 | 1731 | 1675 |

TABLE 3

|  | H | I | J | K | L | 13 | 14 | 15 | 16 | 17 | 18 | 19 | 20 | 21 | 22 |
|---|---|---|---|---|---|---|---|---|---|---|---|---|---|---|---|
| PC 3 | 64 | 64 | 64 | 64 | 64 | 64 | 64 | 64 | 64 | 64 | 64 | 64 | 64 | 64 | 64 |
| SAN 2A | 20 | 20 | 20 | 20 | 20 | 13.3 | 6.7 | — | 14.3 | 8.6 | — | 15.5 | 10.9 | 6.4 | 1.8 |
| SAN Gel-1 | — | — | — | — | — | 6.7 | 13.3 | 20 | — | — | — | — | — | — | — |
| SAN Gel-2 | — | — | — | — | — | — | — | — | 5.7 | 11.4 | 20 | — | — | — | — |
| SAN Gel-3 | — | — | — | — | — | — | — | — | — | — | — | 4.5 | 9.1 | 13.6 | 18.2 |
| HRG 1 | 16 | 16 | 16 | 16 | 16 | 16 | 16 | 16 | 16 | 16 | 16 | 16 | 16 | 16 | 16 |
| DEPX | — | 0.1 | 0.2 | 0.3 | 0.4 | — | — | — | — | — | — | — | — | — | — |
| % Epoxy in Blend | — | 0.1 | 0.2 | 0.3 | 0.4 | 0.1 | 0.2 | 0.3 | 0.1 | 0.2 | 0.35 | 0.1 | 0.2 | 0.3 | 0.4 |
| Compounding: Leistritz 34 mm, 250 RPM, 24–26 Amp. | | | | | | | | | | | | | | | |
| Molding: 525° F., Melt: 150° F. Mold | | | | | | | | | | | | | | | |
| Hunter Gloss | | | | | | | | | | | | | | | |
| 60°4 × 6 Textured | 14 | 13 | 11 | 6 | 4 | 14 | 13 | 12 | 13 | 12 | 10 | 13 | 12 | 10 | 8 |
| 60°4 × 6 Smooth | 97 | 92 | 61 | 19 | 11 | 95 | 91 | 64 | 94 | 86 | 58 | 93 | 73 | 48 | 34 |
| Melt Viscosity, 550° F., (poise) | | | | | | | | | | | | | | | |
| 1000 sec-1 | 1626 | 1626 | 1776 | 1879 | 2531 | 1833 | 1906 | 1823 | 1756 | 1903 | 2118 | 1653 | 1663 | 1730 | 1692 |

What is claimed is:

1. A process for making a reduced gloss thermoplastic composition, said process comprising:

(a) Compounding an acrylonitrile polymer with an electrophilic reagent to form polymeric gels;

(b) blending an effective gloss reducing amount of said gels with a thermoplastic resin.

2. The process of claim 1 wherein said composition comprises from 10 to 99 weight percent of the thermoplastic resin based on the total weight of the composition.

3. The process of claim 2 wherein said thermoplastic resin is a bisphenol A polycarbonate.

4. The process of claim 1 wherein said electrophilic reagent is a diepoxide and said diepoxide has the structural formula:

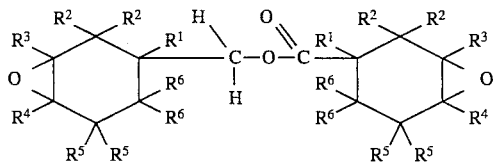

wherein each $R^1$, $R^2$, $R^3$, $R^4$, $R^5$, and $R^6$, is independently selected from the group consisting of hydrogen and alkyl radicals.

5. The process of claim 1 wherein said electrophilic reagent comprises a poly(epoxide) present in an amount of from 0.01 to 10 weight percent based on the total weight of the acrylonitrile polymer in step (a).

6. The process of claim 1 wherein said compounding comprises extrusion compounding.

7. The process of claim 1 wherein said blending comprises extrusion compounding.

8. A process for making a reduced gloss thermoplastic composition, said process comprising:

(a) compounding an acrylonitrile polymer with an electrophilic reagent to form polymeric gels; and (b) blending an effective gloss reducing amount of said gels with a polycarbonate resin, a styrene-acrylonitrile copolymer and an ABS graft polymer.

9. The process of claim 8 wherein said composition comprises from 10 to 90 weight percent of the polycarbonate resin based on the total weight of the composition.

10. The process of claim 9 wherein said polycarbonate resin is a bisphenol A polycarbonate.

11. The process of claim 10 wherein the ABS graft polymer comprises at least 50 weight percent diene rubber based on the total weight of the ABS graft polymer, said ABS graft polymer being present in the composition at a level of between 5 to 30 weight percent based on the total weight of the composition, said styrene acrylonitrile copolymer being present at a level of from 5 to 65 weight percent based on the total weight of the composition.

12. The process of claim 8 wherein said electrophilic reagent comprises a diepoxide.

13. The process of claim 12 wherein said diepoxide has the structural formula:

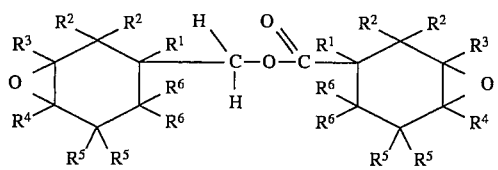

wherein each $R^1$, $R^2$, $R^3$, $R^4$, $R^5$, and $R^6$, is independently selected from the group consisting of hydrogen and alkyl radicals.

14. The process of claim 8 wherein said electrophilic reagent comprises a poly(epoxide) present in an amount of from 0.01 to 10 weight percent based on the total weight of the acrylonitrile polymer in step (a).

15. The process of claim 8 wherein said compounding comprises extrusion compounding.

16. The process of claim 15 wherein said blending comprises extrusion compounding.

17. A process for making a thermoplastic composition, said process comprising:
   (a) compounding a styrene-acrylonitrile copolymer with an acid and an electrophilic reagent sufficient to form a gelled styrene-acrylonitrile polymer;
   (b) blending a sufficient amount of said gelled styrene-acrylonitrile polymer with an aromatic polycarbonate resin and ABS graft polymer and styrene-acrylonitrile copolymer to form a low gloss composition.

18. The process of claim 17 wherein said composition comprises a phosphite.

19. The process of claim 17 wherein said composition comprises an additive selected from the group consisting of a pigment, phosphates, hindered phenolic antioxidant, lubricants and mixtures thereof.

20. A composition comprising:
   (a) an aromatic polycarbonate,
   (b) a graft polymer comprising from 10 to 90 weight percent of a rubbery polymeric substrate and from 10 to 90 weight percent of a grafting copolymer grafted to the rubbery polymer substrate, said grafting copolymer being formed from 60 to 95 weight percent of at least one monomer selected from the group consisting of styrene, α-methyl styrene, halogen substituted styrene and methyl methacrylate and from 5 to 40 weight percent of at least one different monomer selected from the group consisting of acrylonitrile, methylmethacrylate, maleic anhydride, malemide, N-phenyl maleimide, and acrylamide; and
   (c) a rigid polymer formed from at least 50 weight percent of at least one monomer selected from the group consisting of styrene, α-methylstyrene and halogen substituted styrene, and at least 20 weight percent acrylonitrile; and
   (d) a gloss reducing amount of gels formed from crosslinking a rigid polymer from at least one monomer selected from the group consisting of styrene, α-methylstyrene and halogen substituted styrene, and at least 10 weight percent acrylonitrile.

21. A low gloss composition comprising:
   (a) a thermoplastic resin, and
   (b) an effective gloss reducing amount of gels of a rubber-free rigid acrylonitrile polymer, said acrylonitrile polymer and said thermoplastic resin being chemically different polymeric materials.

22. A process for making acrylonitrile polymer gels, said process comprising: compounding a composition consisting of an acrylonitrile polymer with an effective amount of an electrophilic reagent to produce acrylonitrile polymer gels.

23. The process of claim 22 wherein said composition is free of rubber.

24. The process of claim 22 wherein said electrophilic reagent comprises a polyepoxide.

25. The process of claim 1 wherein said compounding is done under acidic conditions.

26. The process of claim 2, wherein said thermoplastic resin is acrylonitrile butadiene styrene.

27. The process of claim 8, wherein said thermoplastic resin is acrylonitrile butadiene styrene.

* * * * *